United States Patent Office 3,590,053
Patented June 29, 1971

3,590,053
METHOD OF PRODUCING 3,7-DIMETHYL-6,7-EPOXY-OCTAN-1-AL
George Oswald Chase, Hawthorne, and Alfred Alfonse Pilarz, Lincoln Park, N.J., assignors to Givaudan Corporation, Clifton, N.J.
No Drawing. Filed Mar. 11, 1968, Ser. No. 711,910
Int. Cl. C07d 1/00, 1/12
U.S. Cl. 260—348                    10 Claims

ABSTRACT OF THE DISCLOSURE

A new and improved method for porducing 3,1-dimethyl-6,7-epoxy-octan-1-al from a dialkanoyl derivative of 3,7-dimethyl-2,6-octadien-1-al or from a mono alkanoyl derivative of 3,7 - dimethyl - 1,2,6 - octatrien-1-ol and intermediates therein are disclosed.

BACKGROUND OF THE INVENTION 3,7-dimethyl - 6,7 - epoxy-octan - 1 - al (6,7-epoxycitronellal) which has the formula:

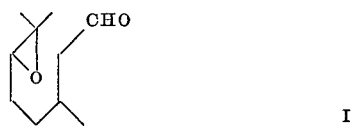

I is a known compound, which because of its soft floral odor with a green nuance, is extremely useful as an odorant in the preparation of perfumes and other scented compositions.

In the past, 6,7-epoxy-citronellal has been prepared by the epoxidation of 3,7-dimethyl-6-octen-1-al (citronellal). Such a technique produces 6,7-epoxy-citronellal admixed with other undesriable side-products of the epoxidation reaction which severely lower the yield of 6,7-epoxy-citronellal. Furthermore, these side-products are difficult and expensive to separate. This is extremely disadvantageous since in order to be utilized in perfume or to have value as an odorant, the 6,7-epoxy-citronellal must be in a relatively pure state.

Another disadvantage that is encountered in utilizing citronellal as a starting material for 6,7-epoxy-citronellal is that natural citronellal, as commercially available, is an admixture with various other terpenic compounds. This is true since the citronellal derived from natural Java citronella oil is admixed with other terpenic compounds. Additionally, the selective partial reduction of a carbon-carbon double bond in a naturally occurring polyolefinic compound such as citral to produce citronellal, also produces various undesirable hydrogenation by-products. Furthermore, the additional steps needed to purify citronellal or citral to convert them to 6,7-epoxy-citronellal, which steps are over and above the epoxidation step, reduce the final yield of 6,7-epoxy-citronellal.

SUMMARY OF INVENTION

In accordance with this invention, 6,7-epoxy-citronellal of the Formula I can be prepared by first epoxidizing either of the following two compounds:

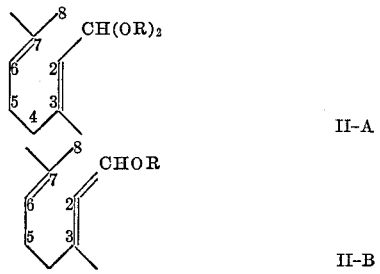

wherein R is lower alkanoyl, with an organic per-acid to form the corresponding 6,7-epoxy compounds without affecting the double bonds in any of the other positions in the compounds of Formula II–A or Formula II–B. The 6,7-epoxy compounds are then reacted with an alkali metal bicarbonate and thereafter, catalytically reduced to form the compound of Formula I.

In accordance with this invention, it has been found that this three-step process produces 6,7-epoxy-citronellal from the compounds of Formula II–A or II–B in higher yields than that obtainable by the prior art process. Furthermore, the epoxidation with per-acids of compounds of Formula II–A or II–B can be carried out with yields as high as 90 percent since epoxidation only takes place at the double bond at the 6-position without affecting the double bond in the 1 or 2-positions.

The compounds of Formulae II–A and II–B are formed as a mixture from dehydrolinalool by esterification and rearrangement. In accordance with this invention, the mixture containing the compounds of Formulae II–A and II–B can be converted to a compound of Formula I above. Therefore, the process of this invention provides a means for converting the mixture resulting from the esterification and rearrangement of dehydrolinalool into the compound of Formula I above so as to provide the compound of Formula I above in high yields and with a high degree of purity.

DETAILED DESCRIPTION

The numbering of the octadiene chain in Formulae II–A and II–B above is shown for the purposes of convenience.

As used throughout the specification, the term "lower alkanoyl" includes alkanoyl groups containing from 2 to 6 carbon atoms such as acetyl, propionyl, butyryl, etc.

The production of compounds of the Formula I from compounds of the Formulae II–A and II–B is carried out by the following reaction scheme:

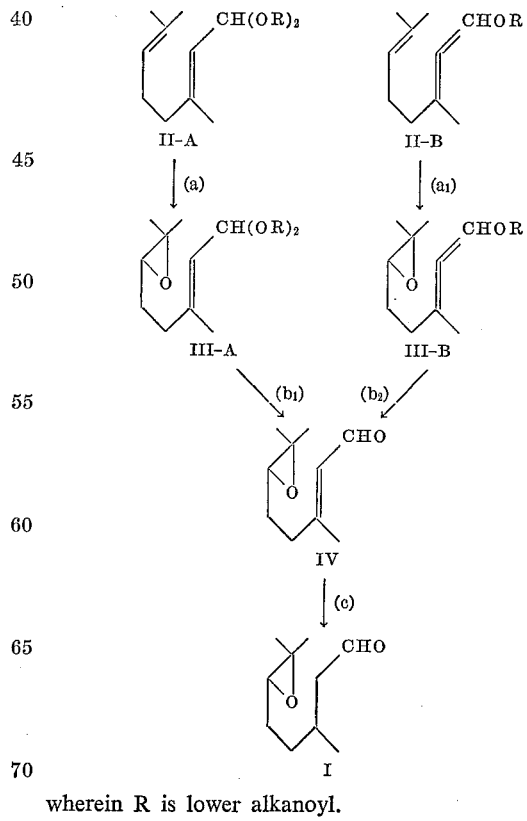

wherein R is lower alkanoyl.

Compounds of the Formula II–A and compounds of the Formula II–B are respectively converted to compounds of the Formulae III–A and III–B by reaction steps (a) and ($a_1$). The reaction steps (a) and ($a_1$) are carried out by the same means. This is accomplished by treating the compound of the Formula II–A above or II–B above with an organic per-acid. Among the preferred epoxidizing agents are the per acids of lower alkanoic acids which contain from 1 to 6 carbon atoms such as formic acid, acetic acid, etc. per-acids of aromatic acids containing from 7 to 17 carbon atoms such as benzoic acid, phthalic acid, etc. Generally, it is preferred to carry out this reaction at a temperature of from 0° C. to 35° C. Generally, it is preferred to carry out this reaction in the presence of an inert organic solvent. Any conventional inert organic solvent can be utilized. Among the inert organic solvents which can be utilized are included toluene, benzene, hexane, dichloroethane, chloroform, methylene chloride, etc.

The reaction steps ($b_1$) and ($b_2$) which convert compounds of the Formula III–A and compounds of the Formula III–B into compounds of the Formula IV can be carried out in the same manner. The reaction of step ($b_1$) and ($b_2$) is carried out by treating either compounds III–A or III–B with an alkali metal bicarbonate salt. Any conventional alkali metal bicarbonate salt such as sodium or potassium bicarbonate can be utilized in this step. Generally, this reaction is carried out in the presence of an inert polar solvent. Typical inert polar solvents which can be utilized include water, lower alkanols such as methanol or mixtures of a lower alkanol such as methanol and an inert solvent such as petroleum naphtha or toluene. While this reaction can proceed at room temperature, it is generally preferred to utilize temperatures of from 50° C. to 80° C. to accelerate this reatcion.

The compound of Formula IV can be converted to the compound of Formula I, as in reaction step (c) by hydrogenating the double bond of the compound of Formula IV. Any conventional method of hydrogenating an olefinic double bond can be utilized in carrying out the reaction of step (e). A typical method of hydrogenating is by passing hydrogen gas into the reaction mixture in the presence of a catalyst. Suitable as the catalysts, are for example, palladium, palladium on charcoal, etc. Generally, this reaction is carried out in the presence of an inert organic solvent. Any conventional inert organic solvent can be utilized. Generally, in carrying out this reaction, atmospheric pressure and room temperature can be utilized. However, if desired, elevated temperatures and pressures can be utilized with slightly super-atmospheric pressure being preferred.

The following examples are illustrative but not limitative of this invention.

EXAMPLE 1

Preparation of 1,1-diacetoxy-3,7-dimethyl-6,7-epoxy-2-octene 152.6 g. of (98 percent pure) 1,1-diacetoxy-3,7-dimethyl-2,6-octadiene was dissolved in 900 ml. of methylene chloride. The solution was stirred and cooled to 10° C. To this was slowly added a solution of 10 g. of sodium acetate trihydrate in 130 ml. of aqueous acid solution containing about 40 percent by weight of acetic acid, about 13 percent by weight of water and about 41 percent by weight of per-acetic acid, over a period of 30 minutes. The reaction mixture was cooled to maintain the reaction temperature at a maximum of 20° C. during addition. After the addition, the reaction mixture was stirred at room temperature for two hours and allowed to stand at room temperature overnight. The reaction mixture then was added with stirring to one liter of cold tap water. After separation of the two phases formed, the aqueous acetic acid phase was separated, discarded, and the methylene chloride phase washed to neutrality with saturated sodium bicarbonate solution. The solvent was removed from the neutral, washed extract by distillation. The residue was distilled under reduced pressure. The product, 1,1-diacetoxy-3,7-dimethyl-6,7-epoxy-2-octene, so obtained boiled at 103 to 104° C., under a vacuum of 0.03 mm. of Hg. 139 grams of this product was obtained in a purity of 98 percent as determined by gas chromatography. This represented a yield of 86 percent based upon the octadiene.

EXAMPLE 2

Preparation of 1-acetoxy-3,7-dimethyl-6,7-epoxy-1,2-octadiene 116.6 g. of 1-acetoxy-3,7-dimethyl-1,2,6-octatriene was dissolved in 900 ml. of methylene chloride and epoxidized exactly as in Example 1. The product obtained was 1-acetoxy - 3,7 - dimethyl - 6,7 - epoxy - 1,2 - octadiene which boiled at 82 to 84° C. under a vacuum of 0.07 mm. of Hg.

EXAMPLE 3

Saponification and Rearrangement of 1,1-diacetoxy-3,7-dimethyl-6,7-epoxy-2-octene A mixture of 99.9 g. of 1,1-diacetoxy-3,7-dimtheyl-6,7-epoxy-2-octene as prepared in Example 1, 185 ml. of methanol, 54 g. of sodium bicarbonate and 30 ml. of water was stirred under reflux for 2 hours. The methanol and water were removed under reduced pressure fom a steam bath and the residue was taken up in toluene. The toluene solution was washed to neutrality with water and then azeotropically dried by removal of the toluene under reduced pressure, protecting the still residue with nitrogen. The crude 3,7-dimethyl-6,7-epoxy-2-octene-1-al obtained was purified by distillation under reduced pressure. This product boiled in the range of 83 to 84° C. under a vacuum of 0.08 mm. of Hg.

EXAMPLE 4

Saponification and Rearrangement of 1-acetoxy-3,7-dimethyl-6,7-epoxy-1,2-octadiene A mixture of 52.6 g. of 1-acetoxy-3,7-dimethyl-6,7-epoxy-1, 2-octadiene as prepared in Example 2, 120 ml. of methanol, 35 g. of sodium bicarbonate was reacted as in Example 3. The product 3,7-dimethyl-6,7-epoxy-2-octene-1-al was obtained.

EXAMPLE 5

Preparation of 3,7–dimethyl-6,7-epoxyoctan-1-al from 1,1-diacetoxy-3,7-dimethyl-6,7-epoxy-2-octene 270.3 g. of pure 1,1-diacetoxy-3,7-dimethyl-6,7-epoxy-2-octene prepared in Example 1 was mixed with 500 ml. of methanol, 146 g. of sodium bicarbonate and 83.4 ml. of water under constant stirring. The mixture was heated and refluxed for two hours. The reaction mixture was then cooled to room temperature and 5.4 g. of 5 percent palladium on charcoal was added. Then hydrogen gas was passed into the reaction mixture at about a pressure of 15 inches of water while the temperature was maintained at 20 to 25° C. After no further hydrogen was absorbed by the reaction mixture, the catalyst was removed by filtration. The resulting filtrate was concentrated to an oil by distillation under slightly reduced pressures (about 300 to 400 mm. Hg). The residual oil was dissolved in about 500 ml. toluene and the toluene solution was washed with water to neutrality. The toluene was removed by distillation and the residue was fractionated under reduced pressure. The product obtained from fractionation was 3,7-dimethyl-6,7-epoxy-octan-1-al which boils at 65° C.–66° C. under a vacuum of 0.1 mm. of Hg.

EXAMPLE 6

Preparation of 3,7-dimethyl-6,7-epoxyoctan-1-al from 1-acetoxy-3,7-dimethyl-6,7-epoxy-1,2-octadiene 210.3 g. of 1 - acetoxy - 3,7 - dimethyl - 6,7 - epoxy-1,2-octadiene was mixed with 500 ml. of methanol, 146 g. of sodium bicarbonate and 83.4 ml. of water. This mixture was stirred under reflux for two hours. After the reflux period, the mixture was hydrogenated and the product recovered by the procedure given in Example 5. The product obtained was 3,7-dimethyl-6,7-epoxyoctan-1-al. This product was identical to the product obtained in Example 5.

EXAMPLE 7

Preparation of 3,7-dimethyl-6,7-epoxyoctan-1-al from a crude mixture of 1,1-diacetoxy-3,7-dimethyl-2,6-octadiene and 1-acetoxy-3,7-dimethyl-1,2,6-octatriene A crude reaction mixture (77.8 percent pure) of 1,1-diacetoxy - 3,7 - dimethyl - 2,6 - octadiene and 1-acetoxy-3,7-dimethyl-1,2,6-octatriene shown by gas chromatography to contain the two compounds in the ratio of approximately 60 percent of the diacetoxy compound to 40 percent of the monoacetoxy compound was epoxidized as follows:

1.872 kilos of the above crude reaction mixture was dissolved in 9.33 liters of toluene. The solution was cooled with stirring to 10° C. To this solution was added, over one and one-half hours, a solution of 122.7 g. of sodium acetate trihydrate in 1.60 liters of the 40 percent peracetic acid solution utilized in Example 1. Cooling was applied to keep the reaction temperature at 20° C. maximum. The mixture was stirred for two hours longer and allowed to stand overnight at room temperature. The toluene solution of the reaction product was stirred with water and then washed with an aqueous bicarbonate solution to wash the toluene solution to remove the acetic acid. The solvent was removed by distillation under slightly reduced pressure. The crude mixture of 1,1-diacetoxy-3,7-dimethyl-6,7-epoxy-2-octene and 1-acetoxy-3,7-dimethyl-6,7-epoxy-1,2-octadiene weighed about 1.7 kilos. To this product was added 3.285 liters of methanol, 0.959 kilo of sodium bicarbonate and 545 mls. of water. This reaction mixture was stirred under reflux for two hours, cooled to room temperature and 35.5 g. of 5 percent palladium on charcoal catalyst was added. After hydrogenation to saturation at slightly superatmospheric pressure at 20 to 25° C., the hydrogenation catalyst was recovered by filtration and the solvent was removed by distillation under slightly reduced pressure. The residual oil was again dissolved in toluene and the toluene solution was washed with water to neutrality. The solvent was now removed by distillation under slightly reduced pressure and the still residue was fractionated. 740.9 grams of perfume grade of 3,7-dimethyl-6,7-epoxyoctan-1-al (6,7-epoxycitronellal) was collected in the boiling range of 65 to 66° C. under a vacuum of 0.1 mm. of Hg. This product as collected was 100 percent pure as determined by gas chromatography. This represented an overall yield for the combination of the three reactions involved of 68 percent of theory based upon the 2,6-octadiene and 1,2,6-octatriene starting material.

We claim:

1. A compound of the formula:

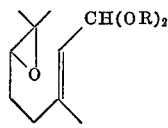

wherein R is lower alkanoyl.

2. A compound in accordance with claim 1. wherein R is acetyl.

3. A compound of the formula:

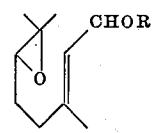

wherein R is lower alkanoyl.

4. A compound in accordance with claim 3, wherein R is acetyl.

5. A process of producing an aldehyde compound of the formula:

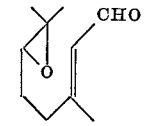

which comprises treating an alkanoyl derivative of the formula:

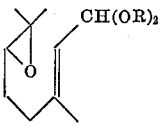

wherein R is lower alkanoyl with an alkali metal bicarbonate and wherein said alkanoyl derivative is formed by treating a compound of the formula:

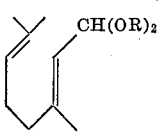

wherein R is as above with an organic per acid.

6. The process of claim 5, wherein said per-acid is peracetic acid.

7. A process for producing a compound of the formula:

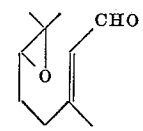

which comprises treating an alkanoyl derivative of the formula:

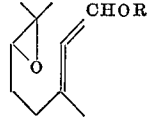

wherein R is lower alkanoyl with an alkali metal bicarbonate and wherein said alkanoyl derivative is formed by treating a compound of the formula:

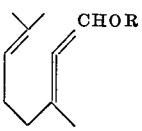

wherein R is as above with an organic per-acid.

8. The process of claim 7, wherein said organic per-acid is per-acetic acid.

9. A process of producing an ethylenically unsaturated epoxy compound of the formula:

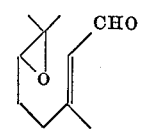

from a mixture composed of a dialkanoyl derivative of the formula:

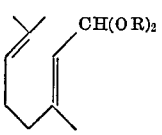

wherein R is a lower alkanoyl and a mono alkanoyl derivative of the formula:

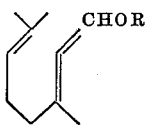

wherein R is as above, comprising:
(a) treating said mixture with an organic per-acid so as to epoxidize said mixture and,
(b) treating said epoxidized mixture with an alkali metal bicarbonate to form said ethylenically unsaturated epoxy compound.

10. A process for producing a compound of the formula:

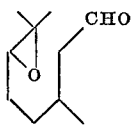

comprising the steps of (i) producing an ethylenically unsaturated epoxy compound of the formula:

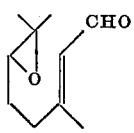

from a mixture composed of a dialkanoyl derivative of the formula:

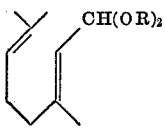

wherein R is a lower alkanoyl and a mono-alkanoyl derivative of the formula:

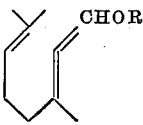

wherein R is as above, comprising:
(a) treating said mixture with an organic per-acid so as to epoxidize said mixture and,
(b) treating said epoxidized mixture with an alkali metal bicarbonate to form said ethylenically unsaturated epoxy compound and
(ii) subsequently hydrogenating said ethylenically unsaturated epoxy compound to reduce the ethylenically unsaturated double bond.

References Cited

UNITED STATES PATENTS

| | | | |
|---|---|---|---|
| 3,336,241 | 8/1967 | Shokal | 260—348X |
| 2,891,969 | 6/1959 | Phillips et al. | 260—348 |
| 2,874,183 | 2/1959 | Isler et al. | 260—348X |

FOREIGN PATENTS

| | | | |
|---|---|---|---|
| 547,646 | 10/1957 | Canada | 260—348 |

OTHER REFERENCES

Swern, Daniel, Jour. Amer. Chem. Soc., vol 69, No. 7, July 1947, pp. 1692–8.

W. J. Hickinbottom, Reactions of Organic Compounds (1948), pp. 10–13.

NORMA S. MILESTONE, Primary Examiner

U.S. Cl. X.R.

260—348.5; 252—522

UNITED STATES PATENT OFFICE
CERTIFICATE OF CORRECTION

Patent No. 3,590,053            Dated June 29, 1971

Inventor(s) George Oswald Chase et al.

It is certified that error appears in the above-identified patent and that said Letters Patent are hereby corrected as shown below:

Column 1, line 13, "3, 1-dimethyl-6, 7-epoxy-octan-1-al" should read -- 3, 7-dimethyl-6, 7-epoxy-octan-1-al. --; same column 1, formula 11-B, lines 67-72, insert the number of carbon -- 4 --. Column 3, line 42, "(e)" should read -- (c) --. Column 6, claim 3, the formula should appear as shown below:

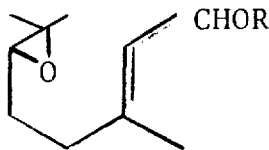

Signed and sealed this 23rd day of May 1972.

(SEAL)
Attest:

EDWARD M. FLETCHER, JR.　　　　　　　　ROBERT GOTTSCHALK
Attesting Officer　　　　　　　　　　　　Commissioner of Patents